United States Patent
Taylor et al.

(10) Patent No.: US 7,717,433 B2
(45) Date of Patent: May 18, 2010

(54) DYNAMIC SEAL ASSEMBLY

(75) Inventors: James E. Taylor, Lake Jackson, TX (US); Milton R. Hertel, Angleton, TX (US)

(73) Assignee: Equistar Chemicals, LP, Houston, TX (US)

( * ) Notice: Subject to any disclaimer, the term of this patent is extended or adjusted under 35 U.S.C. 154(b) by 189 days.

(21) Appl. No.: 11/799,907

(22) Filed: May 3, 2007

(65) Prior Publication Data

US 2008/0272555 A1 Nov. 6, 2008

(51) Int. Cl.
*F16J 15/447* (2006.01)
*F16J 15/18* (2006.01)
*F16J 15/26* (2006.01)

(52) U.S. Cl. .................. 277/416; 277/510; 277/519; 277/533; 277/543

(58) Field of Classification Search ............... 277/416, 277/496, 497, 498, 510, 511, 512, 515, 516, 277/519, 520, 521, 533, 534, 543, 540, 541, 277/545

See application file for complete search history.

(56) References Cited

U.S. PATENT DOCUMENTS

| | | | | | |
|---|---|---|---|---|---|
| 762,202 | A | * | 6/1904 | Schwabe | 277/346 |
| 808,082 | A | * | 12/1905 | Fuller | 277/547 |
| 3,124,502 | A | * | 3/1964 | Radke | 428/66.4 |
| 3,490,774 | A | * | 1/1970 | Henry et al. | 277/543 |
| 4,093,239 | A | * | 6/1978 | Sugahara | 277/514 |
| 4,270,760 | A | * | 6/1981 | Greiman | 277/350 |
| 4,364,542 | A | * | 12/1982 | Meyer | 251/214 |
| 4,576,385 | A | * | 3/1986 | Ungchusri et al. | 277/562 |
| 4,623,152 | A | * | 11/1986 | St Jean | 277/518 |
| 5,131,666 | A | * | 7/1992 | Hutchens | 277/523 |
| 5,820,129 | A | * | 10/1998 | Reagan | 277/314 |
| 6,325,387 | B2 | * | 12/2001 | Shoemaker | 277/511 |
| 6,932,351 | B1 | * | 8/2005 | Mowll | 277/512 |

* cited by examiner

*Primary Examiner*—Vishal Patel
(74) *Attorney, Agent, or Firm*—Yuanzhang Han

(57) ABSTRACT

A dynamic seal assembly for a rotating member comprising a first split housing carrying a first split seal, a second split housing carrying at least one second split seal, each split seal being resiliently closed so that sealing contact is maintained when the rotating member wobbles. The free ends of the second split seal overlap with one another in either a side-by-side relationship or an over-under relationship, or both.

8 Claims, 10 Drawing Sheets

DYNAMIC SEAL ASSEMBLY

BACKGROUND OF THE INVENTION

1. Field of the Invention

This invention relates to a sealing assembly for a rotating member. More particularly, this invention relates to a dynamic seal assembly for apparatus having a rotary shaft and containing a particulate product.

2. Description of the Prior Art

Although this invention will, for sake of clarity and brevity, be described in respect of a drying drum for polyethylene powder, it is not so limited. This invention is applicable to other types of apparatus that operate in a similar manner.

A conventional polyethylene powder drying drum has a large, hollow drum body pierced longitudinally at its opposing ends with a hollow shaft. The drum is fixed and the shaft turns within the drum. The shaft carries a torus disk rotor for conveying powder in the interior of the drum from one opposing end of the drum to the other, and in so doing drying (separating) the powder (polyethylene particles) from its carrier fluid (hexane).

The hexane wet powder is inserted into the interior of the drum at one end thereof, moved by the torus disk rotor through the longitudinal length of the drum to the opposing end thereof, and dried powder removed from the interior of the drum at that opposing end.

The shaft carrying the torus disk rotor extends out of each of the opposed ends of the drum and rotates in order to turn the torus disk rotor. For polyethylene drying the shaft turns at about 10 revolutions per minute. The shaft is hollow in order for steam to pass through its interior thereby providing drying heat to the interior of the drum and the wet powder. Outside the drum, and close by either opposed end of the drum, the shaft carries a bearing assembly for supporting the rotating shaft.

The polyethylene powder being dried in this apparatus is quite fine, from about 0.5 to about 200 microns. Preventing this powder from seeping out of the drum at the points where the turning shaft extends through the opposing ends of the drum is problematic.

Heretofore, a seal has been used that employs a packing gland with a mating follower, a recess in the gland containing no less than five Teflon based packing rings, and what is known as a lantern ring that is made of Teflon. These packing rings are made of braided rope, and, therefore, are fibrous in nature. All these packing rings are formed from a length of braided packing rope, and are wrapped around the shaft they are to seal against. This can be seen in greater detail by reference to FIG. 2 herein.

These prior art packing rings do not compact evenly when put under pressure by tightening of the packing gland follower for sealing purposes. The packing rings closer to the follower compacted significantly, while the rings further removed from the follower did not compact as much, if at all. These rings tended to leak powder when they became worn. More significantly, leakage occurred when the shaft inevitably wobbled to some, even slight, degree. This was due to the rings not always following the shaft back as it resumed its original position after the wobbling stopped. However it occurred, the leakage resulted in the release of powder from the interior of the drum to the surrounding atmosphere in an uncontrolled and undesired manner.

Also, this prior art seal assembly, with its multitudinous fibrous packing rings, required so much follower tightening for sealing purposes that the rings generated sufficient heat from friction with the shaft that powder that contacted the seal assembly was melted to some degree. This melted powder created a tenacious deposit inside the drum that was difficult, at best, to remove, and added time loss and expense to the routine maintenance of the drying apparatus. This melted powder, in time, gradually destroyed the packing rings causing increased leakage of powder from within the drum to outside the drum.

Further, due to the shaft supporting bearing assemblies that are carried outside and close to each end of the drum, it was quite difficult and expensive to replace the prior art seal assemblies with new assemblies of the same type. This also added time loss and expense to the maintenance of the drying apparatus.

Accordingly, this type of drying apparatus cried out for a more effective seal assembly that produced less frictional heat, and could be removed and replaced in a timely manner without undergoing the expense of removing the bearing assemblies that supported the shaft outside the opposed ends of the drum.

This invention solves all these problems at the same time. This invention provides a dynamic seal that maintains its seal when the shaft wobbles by moving with the shaft, and does so with less frictional heating of the seal assembly. The seal of this invention does not depend on tightening of the follower for sealing purposes, and can be removed from the shaft and a new seal of the same type mounted on the shaft without touching the bearing assemblies that support that shaft.

SUMMARY OF THE INVENTION

This invention retains the packing gland and follower of the prior art, but in the recess of the gland, this invention employs a unique combination of a first split annular housing containing a groove that carries a first split, resiliently closed, non-fibrous ring seal, and a second annular housing containing a groove that carries at least one second split, resiliently closed, non-fibrous ring seal, the second ring seal having free ends that overlap one another.

DETAILED DESCRIPTION OF THE INVENTION

Figure 1:
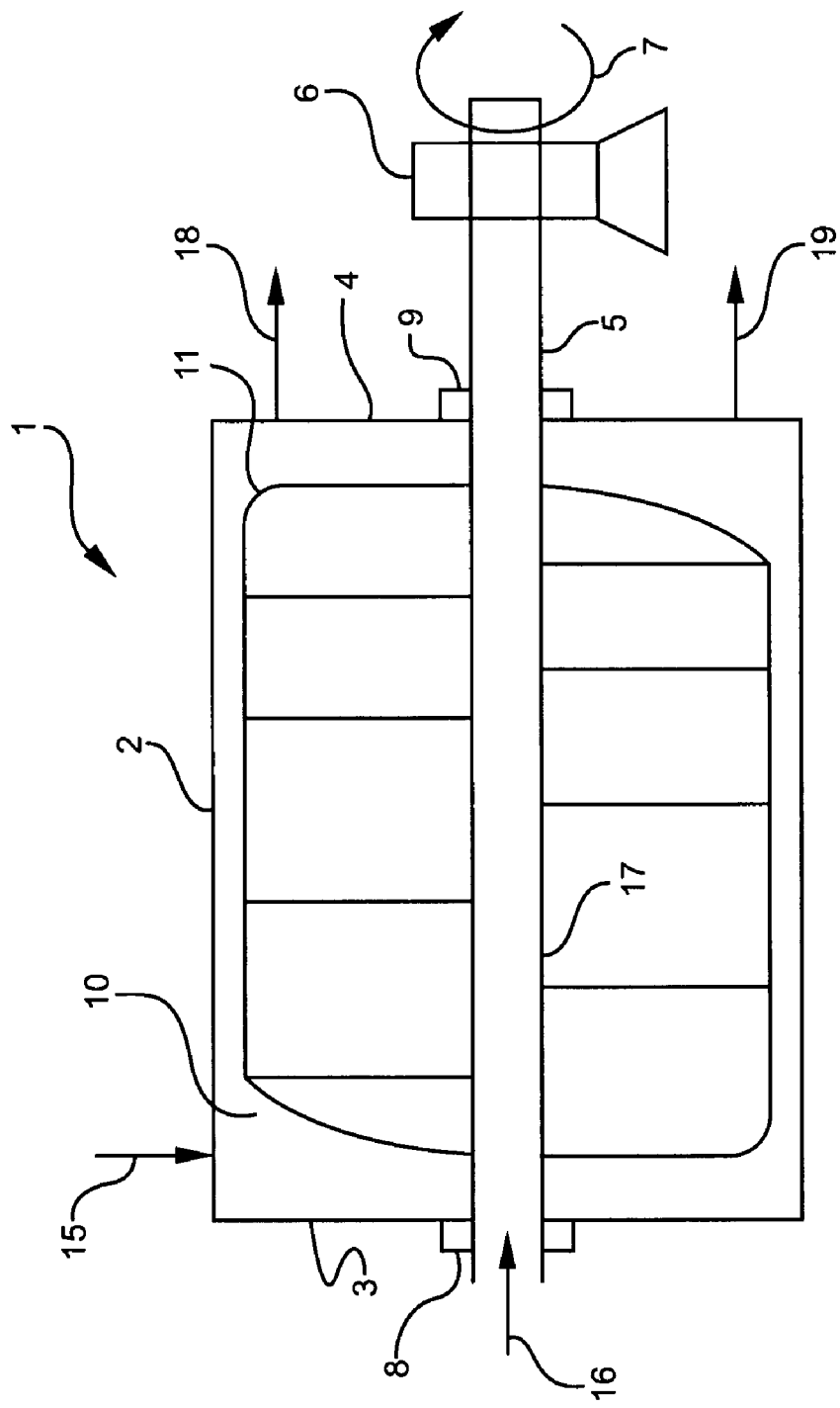
FIG. 1 shows conventional polyethylene powder drying drum apparatus.

FIG. 1 shows a drying apparatus 1 conventionally used in drying polyethylene powder. This Figure shows a hollow drum 2 that is fixed in place (non-rotating) and pierced at its opposed longitudinal ends 3 and 4 by a hollow shaft 5 that is supported on opposite ends of drum 2 by bearing assemblies, just one such assembly 6 being shown in FIG. 1. Shaft 5 is rotated, as shown by arrow 7, by a motor driven chain (not shown) that is connected to shaft 5 in a conventional manner known in the art. Drum ends 3 and 4 carry bearing assemblies 8 and 9, respectively, at the points where shaft 5 enters and leaves drum interior 10. Shaft 5 carries in a fixed manner a typical torus disk rotor 11 that rotates along with shaft 5 so that its torus can move powder from end 3 to end 4 of the drum.

In operation, powder wetted with a carrier fluid is introduced into the interior 10 of drum 2 near end 3 as shown by arrow 15. In the case of polyethylene, the powder can be wetted with a hexane carrier fluid. The interior of the drum 2 is typically at a pressure of about 2 psig. Steam 16 is introduced in a continuous manner into the hollow interior 17 of shaft 5 to provide drying heat to interior 10. Separated carrier fluid is removed from interior 10 at an upper portion of end 4 as shown by arrow 18. Dried powder is removed from interior 10 at a lower portion of end 4 as shown by arrow 19.

When shaft 5 wobbles during operation, powder can escape around either or both of seal assemblies 8 and 9 thereby providing an unwanted deposit of fugitive powder of the floor (not shown) below drum 2.

Figure 2:
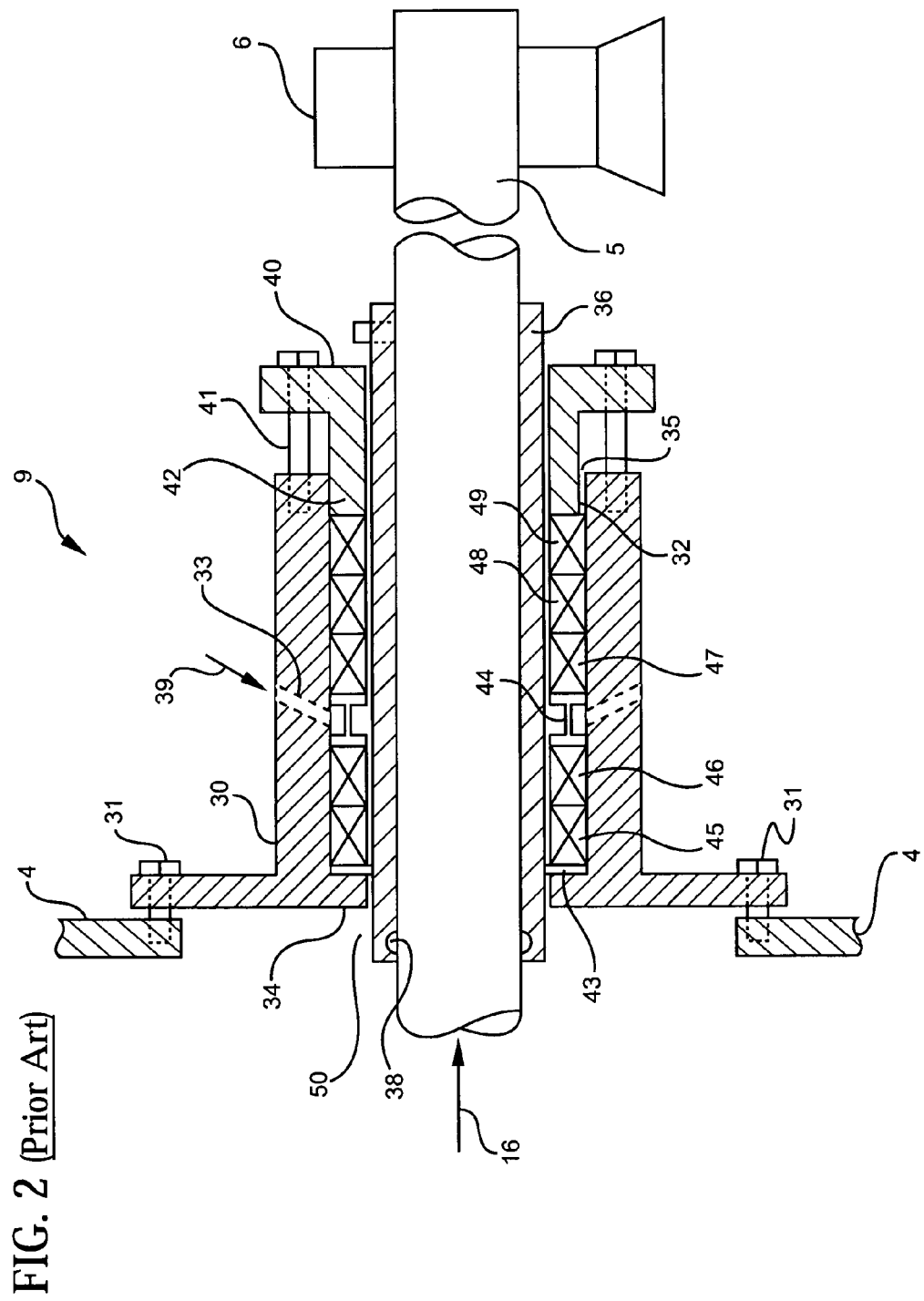
FIG. 2 shows a cross-section of a prior art seal assembly normally employed with the apparatus of FIG. 1.

FIG. 2 shows prior art seal assembly 9 in greater detail. Seal 9 is composed of an annular packing gland 30 that is adapted to be fixed by bolts 31 to drum end 4. Gland 30 has an annular recess 32 that is adjacent to and open to the area of shaft 5. Gland 30 has multiple ports 33 for admitting an inert purge gas 39 to the interior of recess 32. This purge gas, in the case of polyethylene powder, is normally nitrogen at a pressure of about 30 psig and a flow rate of about 13 feet per second and is used to force powder away from gland 30 and prevent its entry into recess 32. Recess 32 has provided by gland 30, an essentially closed end 34 adjacent drum end 4. Recess 32 has an opposing open end 35 which is adapted to receive follower 40.

Shaft 5 carries a typical wear sleeve 36 that is fixed to shaft 5 by way of set screw 37 and sealed to shaft 5 by way of o-ring 38. Annular follower 40 is carried by gland 30 by means of threaded member 41. Follower 40 mates with open end 35 of recess 32, and slidingly engages the hollow interior of recess 32. This way, by rotation of member 41, follower 40 can be moved into and out of the open interior of recess 32 at will thereby providing sealing pressure to the multiple seal rings contained in recess 32 between follower end 42 and closed end 34.

Adjacent closed end 34 is a conventional single piece (unitary, non-split) metallic, annular nose ring 43. Centrally located within recess 32 is a typical unitary lantern ring 44, as mentioned above. Between rings 43 and 44 are at least two conventional, packing rings 45 and 46. Between ring 44 and follower end 42 are at least three additional packing rings 47, 48, and 49.

Rings 43 and 44 and packing rings 45, 46, and 47-49 are all squeezed together by pressure from follower 40 to the extent necessary to form a seal around shaft 5 that prevents powder leakage. This is accomplished by rotation of member 41 to move follower end 42 towards closed end 34. When all these members are squeezed together sufficiently to keep powder from escaping between end 34 and shaft 5, through recess 32, and out to the exterior atmosphere of assembly 9; rings 45, 46, and 47-49 apply so much force to rotating sleeve 36 that excessive frictional heat is generated. This heating can cause any powder that collects in space 50 (where end 34 is adjacent to sleeve 36) to be melted, at least in part, thereby forming an undesired solid deposit in space 50. Further, when shaft 5 wobbles, the seal between that shaft and rings 45, 46, and 47-49 can be broken, thereby allowing un-melted powder in space 50 to escape between end 34 and shaft 5, through recess 32, and into the atmosphere outside drum 2. Additional leakage can occur if any of seals 45, 46, and 47-49 do not follow the movement of shaft 5 back to its original position after the wobbling stops.

In addition, when rings 45, 46, and/or 47-49 become worn, replacement rings cannot be inserted into recess 32 without removing the worn rings and cleaning the hardened, melted powder from the seal housing. Often the bearing assembly 6 must be disassembled from around shaft 5 to gain access to space 50 for cleaning. This becomes a time consuming and costly step.

Also, when wear sleeve 36 becomes worn due to frictional heat from rings 45, 46, and 47-49, the entire bearing assembly 6 must be disassembled in order to replace sleeve 36.

Figure 3:
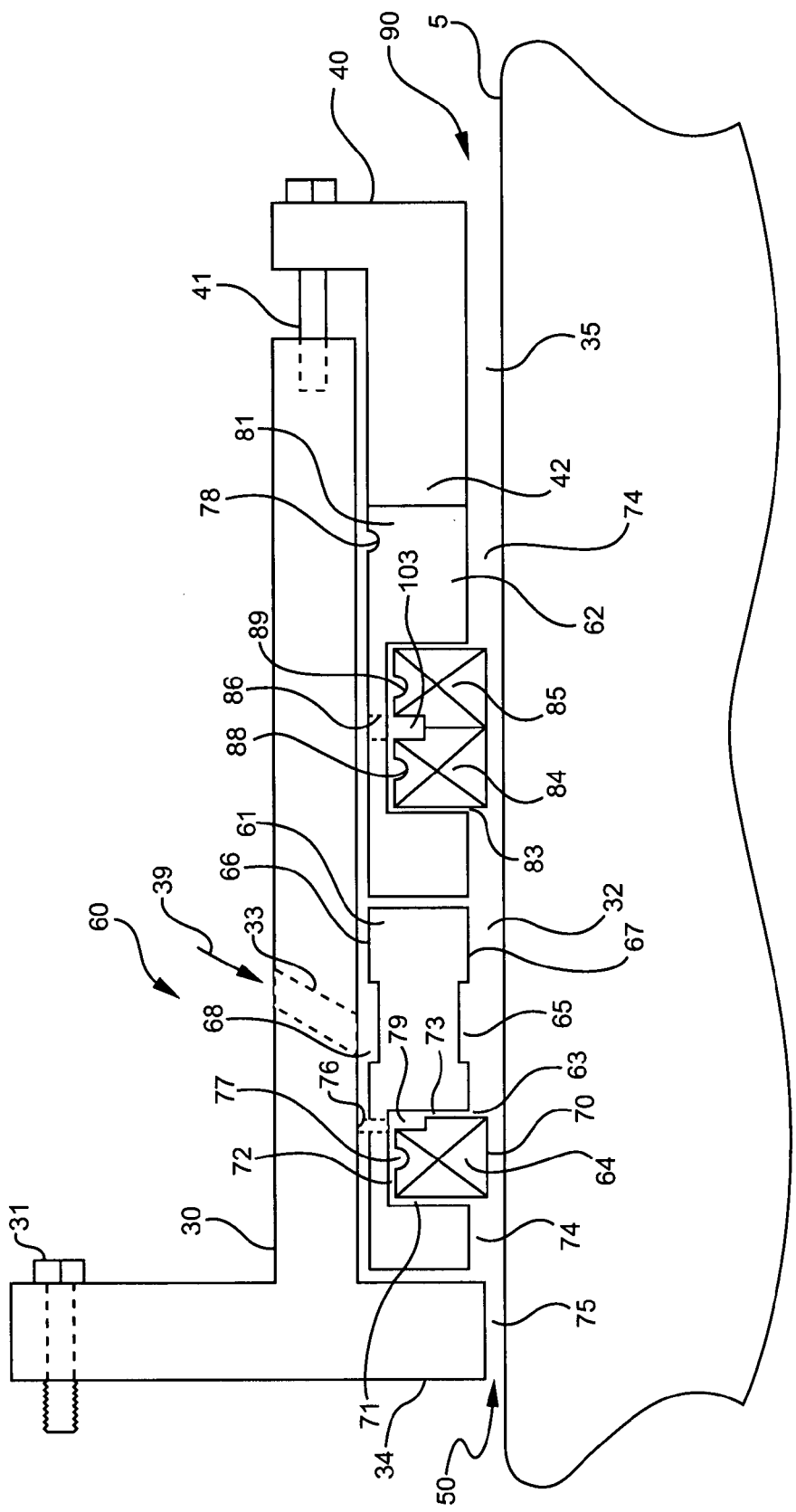
FIG. 3 shows a cross-section of one embodiment of a seal assembly within this invention.

FIG. 3 shows an enlarged cross-section of an upper half portion of an annular seal assembly 60 within this invention. For sake of simplicity only, sleeve 36 is not shown, but it can be used in this invention. The embodiment of FIG. 3 utilizes the aforesaid combination of packing gland 30 (with recess 32) and follower 40, but replaces completely the various members employed within recess 32 of gland 30. In place of these prior art members there is employed an annular first housing 61 and adjacent thereto an annular second housing 62. Housing 61 has an annular groove 63 therein on its inner periphery and adjacent the area of shaft 5.

In groove 63 there is a single split, annular seal ring 64. This single seal ring is of a solid, non-fibrous nature, and can be formed of a material such as polyphenylene sulfide. Solid, non-fibrous seal rings made from polyphenylene sulfide, and other suitable solid seal materials, are commercially available from vendors such as Hoerbiger America Rings and Packing, Inc.

Housing 61 also contains, spaced from groove 63, a set of opposed grooves 65 and 68 that admit the flow of inert gas 39 around the outer and inner peripheries of housing 61.

Split seal ring 64 initially has its sides 70-73 spaced a finite amount from housing 61, e.g., 0.005 of an inch. Gap 74 between the lower side of housing 61 and the upper surface of shaft 5 can initially be, for example, about 1/32 of an inch. This gap distance is essentially maintained throughout the length of recess 32. Gap 75 between the lower surface of end 34 and the upper surface of shaft 5 is smaller than gap 74, e.g., about 1/16 of an inch. Seal 64 is fixed to housing 61 by way of a pin (not shown) in apertures 76 and 79 so that seal 64 cannot rotate relative to housing 61. Seal 64 has a slot 77 around its outer periphery for receiving and holding a resilient member (not shown, see FIG. 6).

Adjacent to housing 61, recess 32 carries a second housing 81. Housing 81 also carries an annular inner periphery groove 83 adjacent the area of shaft 5. Groove 83 contains at least two annular seal rings 84 and 85 that are formed from at least two pieces, i.e., at least doubly split. Seals 84 and 85 are of a solid, non-fibrous nature like that of seal 64, and can be composed of the same material as seal 64. The initial gaps around the four sides of the combination of seals 84 and 85 can be essentially the same as that for the similar four gaps 70-73 of seal 64, i.e., for example, 0.005 of an inch. Seals 84 and 85 are fixed to housing 81 by way of a pin (not shown) in aperture 86 and groove 103, which is mutual to both rings 84 and 85, to prevent rotation of seals 84 and 85 relative to housing 81. Housing 81 has a slot 78 around its outer periphery for receiving and holding an o-ring seal (not shown). The gap between the lower side of housing 81 and the upper surface of shaft 5 is essentially the same as gap 74, the same being true for the lower side of follower 40 and the upper surface of shaft 5. Each of seals 84 and 85 carry on their outer periphery slots 88 and 89 for receiving and holding a resilient member (not shown, see FIG. 10). The upper surfaces of housings 61 and 81, and follower 30 inside recess 32 are essentially in contact with the lower surface of gland 30, although not shown so in FIG. 3 for sake of clarity.

In operation, shaft 5 rotates while assembly 60 remains stationary. Nitrogen 39 passes through ports 33, into channels 65 and 68, through gaps 74 and 75, and into the interior of drum 2 thereby forcing powder that reaches space 50 back into the interior of drum 2 and preventing that powder from reaching recess 32 and the exterior of drum 2 in the vicinity of space 90 of follower 40. When shaft 5 wobbles, singly split seals 64, 84, and 85 open at their split (free) ends and maintain their sealing relation with shaft 5. When the wobbling stops, the seals return to their initial and normal position because of the split closing bias provided by the resilient members encircling each of the seals in slots 77, 88, and 89, see FIGS. 8 and 10. There being a lesser number of seals in assembly 60 than prior art assembly 9, less frictional heating is generated by assembly 60 thereby avoiding melting of powder in space 50. This is accomplished by assembly 60 without sacrificing sealing efficiency. In fact, the sealing efficiency for assembly 60 is improved over that of prior art assembly 9, and this is accomplished with a significantly lesser number of individual seal ring members. By virtue of the split nature of the housings and seal rings of FIG. 3, assembly 60 can be installed on existing drying apparatus without the removal of adjacent bearing assemblies such as assembly 6 of FIG. 2.

Figure 4:
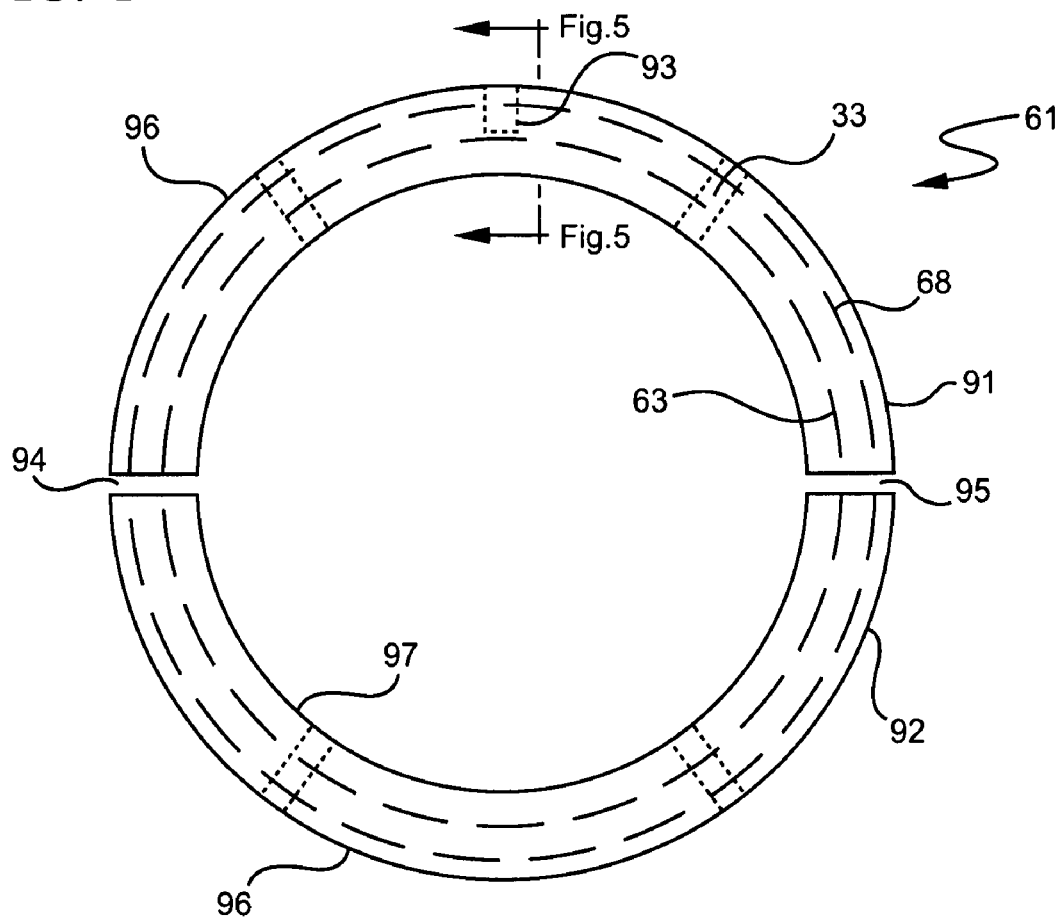
FIG. 4 shows a split, first housing useful in this invention.

FIG. 4 shows a plan view of split housing 61. Housing 61 is shown to be doubly split, and, therefore, composed of two half circle members 91 and 92, each with matching outer peripheral grooves 68 and inner seal grooves 63, matching inner grooves 65 not being shown for sake of clarity only. Opening 93 is provided in member 91 to receive the pin (not shown) used in apertures 76 and 79 of FIG. 3. When members 91 and 92 are fitted around shaft 5 so that their respective inner periphery's 97 are at a position of closest approach to shaft 5, the free ends of each of members 91 and 92 are brought into contact with one another to close areas 94 and 95. When this is done, grooves 63 and 68 on each member meet and match one another to provide, by way of the combination of members 91 and 92, a continuous groove about shaft 5. Members 91 and 92 can readily be fitted around an existing shaft 5, the proximity of bearing assemblies such as assembly 6 of FIG. 2 notwithstanding. Housing 61 can be made up of smaller segments, such as quarter circles, if desired.

Figure 5:
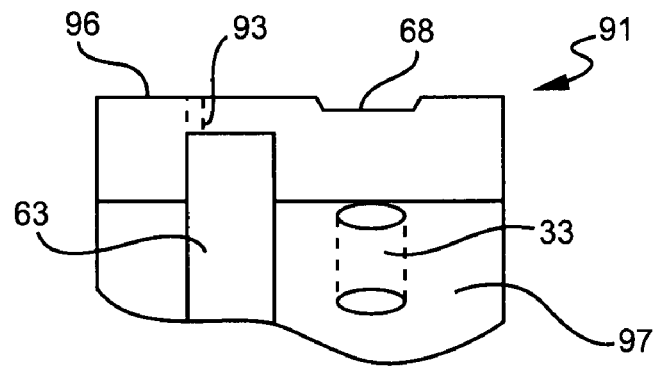
FIG. 5 shows a cross-section of the housing of FIG. 4.

FIG. 5 shows section A-A of FIG. 4. This Figure shows outer groove 68 in outer periphery 96, and inner groove 63 in inner periphery 97. The combination of segments 91 and 92 when mounted around shaft 5 with their free ends in opposing abutment, forms continuous grooves on both the outer periphery 96 and inner periphery 97 which grooves, like the combination of segments 91 and 92, encircle shaft 5.

Figure 6:
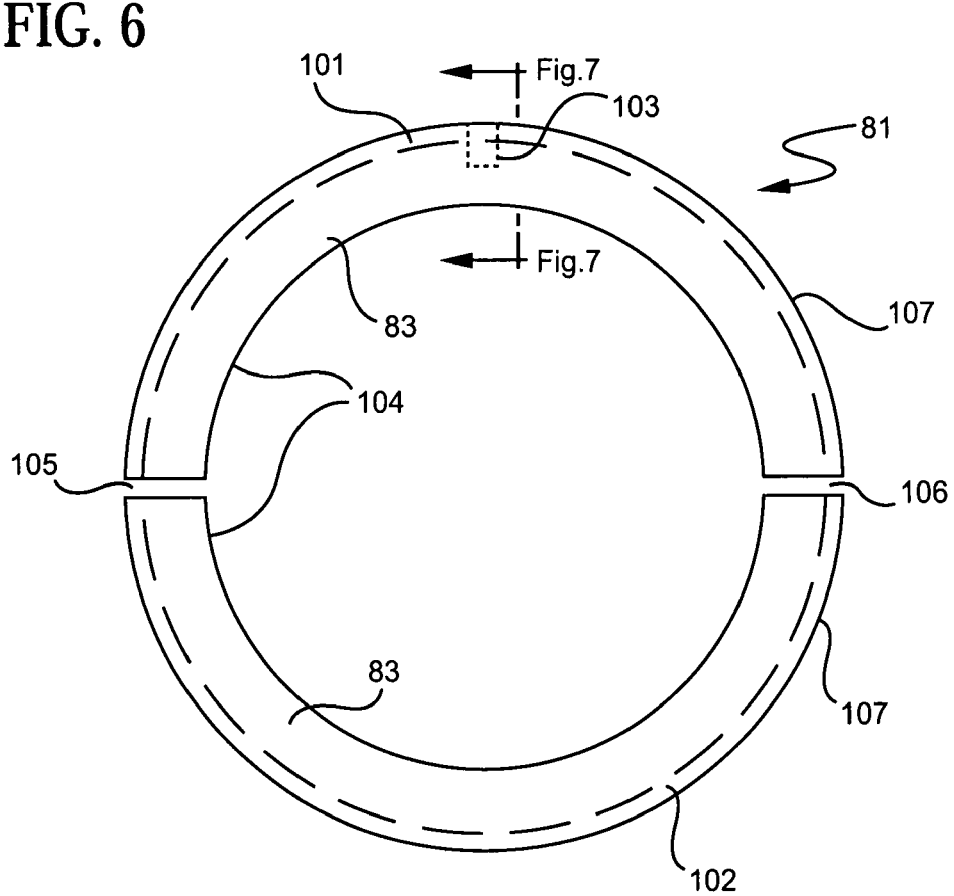
FIG. 6 shows a split, second housing useful in this invention.

FIG. 6 shows a plan view of split housing 81. Housing 81 is shown to be doubly split, and, therefore, composed of two half circle members 101 and 102, each with matching inner grooves 83. Opening 103 is provided in member 101 to receive the pin (not shown) in aperture 86 of FIG. 3. When members 101 and 102 are fitted around shaft 5 so that their respective inner periphery's 104 are at their position of closest approach to shaft 5, the free ends of each of members 101 and 102 are brought into contact with one another to close areas 105 and 106. When this is done, grooves 83 on each member meet and match to provide a continuous groove for the combination of members 101 and 102 about shaft 5. Members 101 and 102 can also readily be fitted around an existing shaft 5, the proximity of bearing assemblies such as assembly 6 of FIG. 2 notwithstanding. Housing 81 can be made up of smaller segments, such as quarter circles, if desired.

Figure 7:
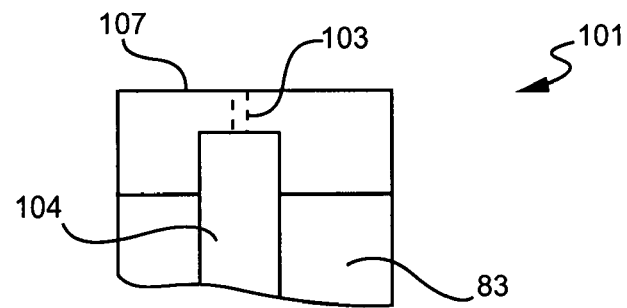
FIG. 7 shows a cross-section of the housing of FIG. 6.

FIG. 7 shows section B-B of FIG. 6. This Figure shows inner groove 83 that follows the inner periphery's 104 of the combined segments 101 and 102. When the segments 101 and 102 are combined around shaft 5 with their free ends in opposing abutment inner groove 83 encircles shaft 5.

Figure 8:
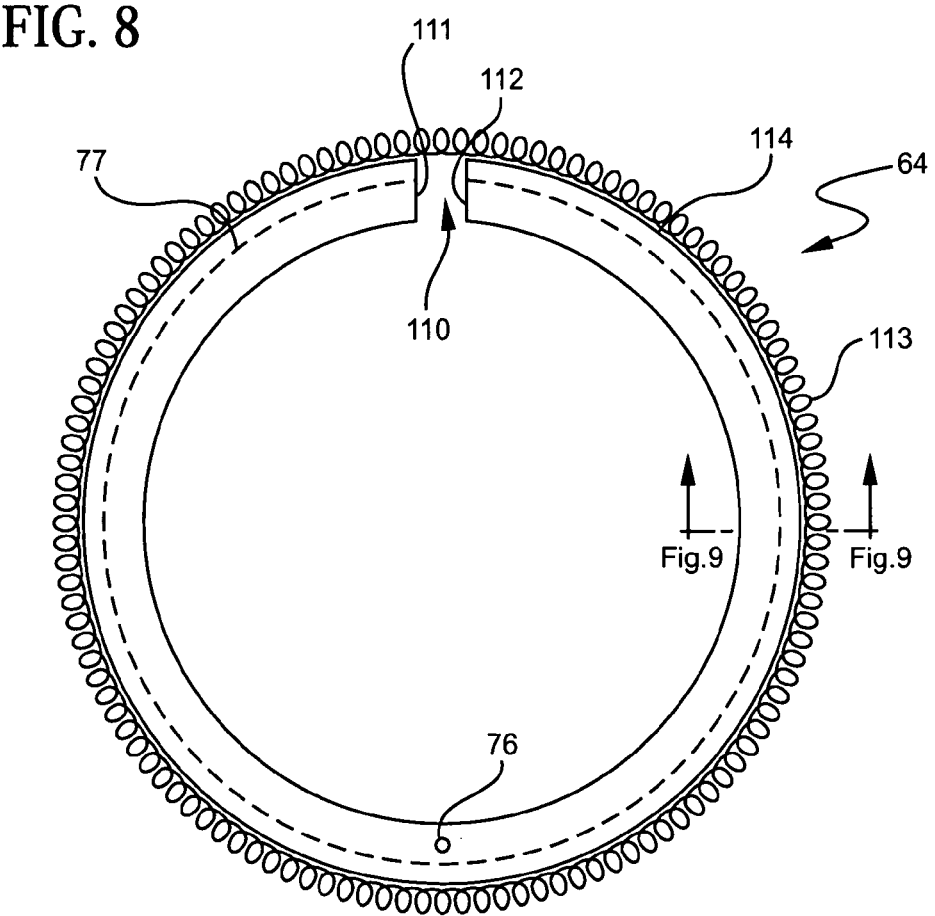
FIG. 8 shows a split, first seal ring useful in this invention.

FIG. 8 shows a plan view of seal ring 64 of FIG. 3. Seal 64 has a single split 110 there through to enable the seal to be brought into encircling engagement with shaft 5 without moving bearing assemblies like assembly 6 of FIG. 2. Free ends 111 and 112 of ring 64 are flat and normally in contact with the flat surface area of one another when the ring is in place around shaft 5, and, during operation. These free ends are biased to stay in contact with one another by resilient member 113.

Member 113 encircles the entirety of the outer periphery 114 of ring 64 in a resilient manner that is biased to normally keep free ends 111 and 112 in abutment. However, should shaft 5 temporarily wobble out of alignment, ring 64 can open at split point 110 to accommodate the wobble without losing sealing contact with the vast majority of the outer surface of shaft 5. This temporary opening movement is against the closing bias of member 113, and as soon as the wobble ends, member 113 will bring free ends 111 and 112 back into abutment thereby closing gap 110. Member 113 rides in groove 77, and can be a coil spring as shown in the Figure or any other resilient material that can be biased toward keeping ends 111 and 112 in contact with one another.

Figure 9:
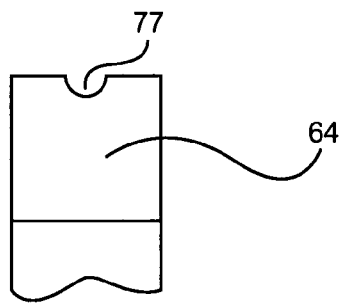
FIG. 9 shows a cross-section of the seal ring of FIG. 8.

FIG. 9 shows section C-C of FIG. 8, and shows better the cross-section of groove 77.

Figure 10:
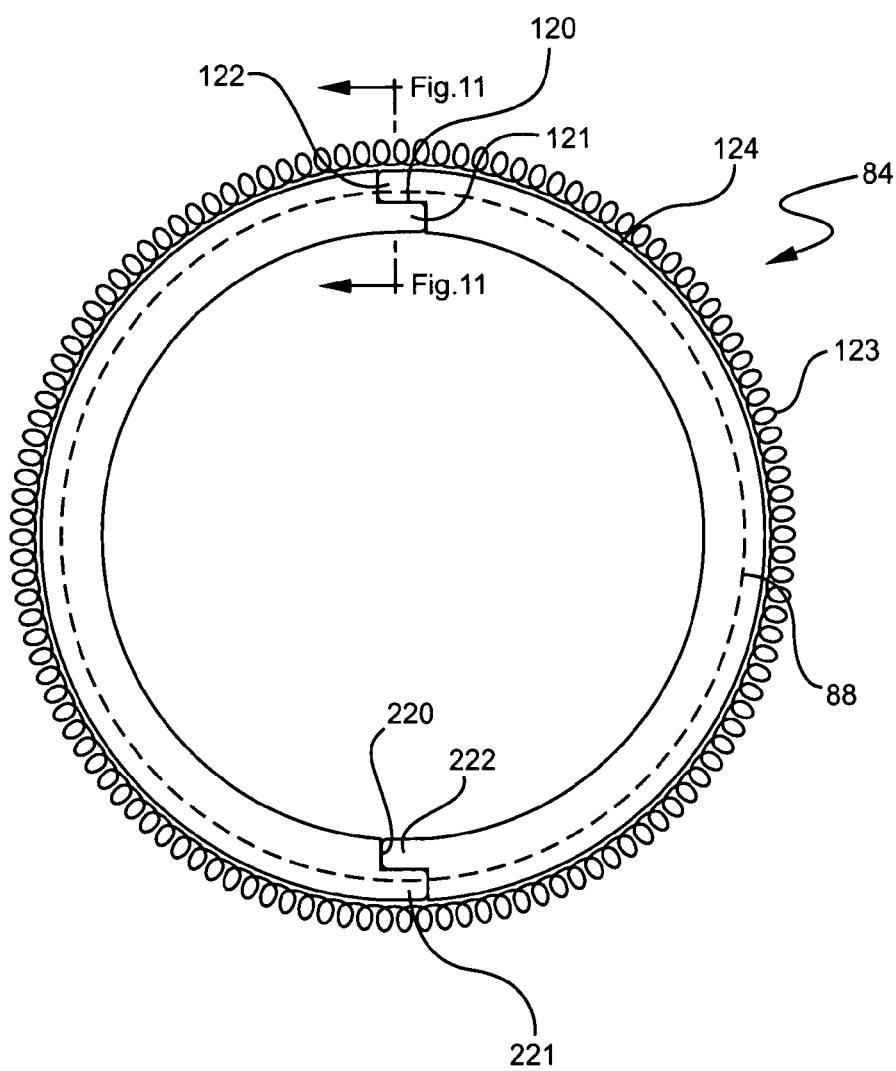
FIG. 10 shows a split, second seal ring useful in this invention.

FIG. 10 shows a plan view of seal ring 84, ring 85 of FIG. 3 being essentially identical. Seal 84 is split at 120 and 220 to provide a seal with double split points 120 and 220 so that seal 84, when assembled, is adaptable to being fitted around shaft 5 without concern for existing assemblies 6 of FIG. 2. However splits 120 and 220 are deliberately not of the same configuration as flat split 110 for seal 64. Instead, split 120, for example, is formed from overlapping protrusions 121 and 122 on each of the free ends of the ring. Protrusions 121 and 122 are normally in overlapping contact with one another when the ring is assembled and in place around shaft 5, and are biased to stay in contact with one another during operation by resilient member 123. Similarly, protrusions 221 and 222 are normally in overlapping contact with one another when the ring is assembled and in place around shaft 5, and are biased to stay in contact with one another during operation by resilient member 123.

Member 123 encircles the entirety of the outer periphery 124 of ring 84 in a resilient manner that is biased to normally keep protrusions 121 and 122 overlapping. However, should shaft 5 temporarily wobble out of alignment, ring 84 can open at either or both of split points 120 and 220 to accommodate the wobble without losing sealing contact with the vast majority of the outer surface of shaft 5. This temporary opening movement is against the closing bias of member 123, and as soon as the wobble ends, member 123 will bring protrusions 121 and 122 and/or 221 and 222 back to overlapping thereby closing gaps 120 and/or 220. Member 123 rides in groove 88, and can be a coil spring as shown in the Figure or any other resilient material that can be biased toward keeping protrusions 121, 122, 221, and 222 overlapping one another.

Figure 11:
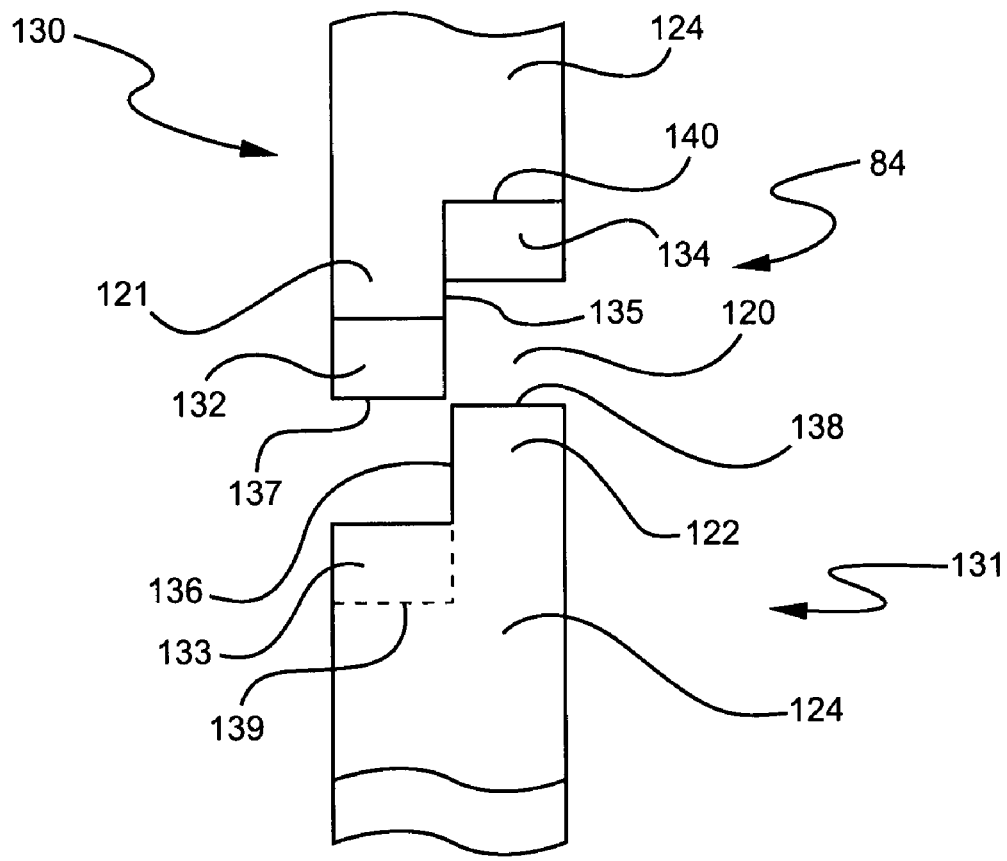
FIG. 11 shows a close-up top view of the ring of FIG. 10.

FIG. 11 shows a close-up top view of split 120 between free ends 130 and 131 of ring 84, and further shows normally overlapping protrusions 121 and 122 to have been moved apart to widen split 120 into a gap. Split 120 would be open in the gapping manner shown in FIG. 11 when ring 84 is being initially installed around shaft 5, or when, in operation, shaft 5 wobbles. Groove 88 and resilient member 123 are not shown for sake of clarity. The open position for split 120, as shown in this Figure, works against the normal, closing bias of member 123. Member 123 will quickly close gap 120, and move protrusions 121 and 122 back into an overlapping relationship, once the ring installation is complete or the wobble stops.

FIG. 11 shows protrusion 121 to carry a lower projection 132. Projection 132 will, when split 120 is closed, extend under protrusion 122 and fit into a recess 133 that is carried in a lower portion of protrusion 122. When split 120 is closed, protrusion 122 will extend over the top of lower surface 134 of protrusion 121. Also when split 120 is closed, sides 135 and 136 will be adjacent one another, and the end walls 137 and 138 will be adjacent, if not abutting, opposing end walls 139 and 140, respectively.

Figure 12:
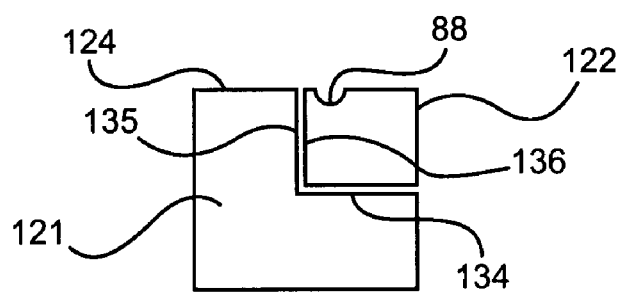
FIG. 12 shows a cross-section of the free ends of the seal ring of FIG. 10.

FIG. 12 shows section D-D of FIG. 10, and shows better the relationship of overlapping protrusions 121 and 122 when split 120 is in its normally closed configuration, i.e., when free ends 130 and 131 are brought into closing contact with one another. This Figure shows protrusion 122 having been moved over the top of surface 134 of protrusion 121, and opposing walls 135 and 136 of protrusions 121 and 122, respectively, having been moved so that they are adjacent one another, if not contiguous. Similarly, in this configuration end walls 138 and 140, and end walls 137 and 139 will have been brought into adjacency, if not actual abutment.

Figure 13:
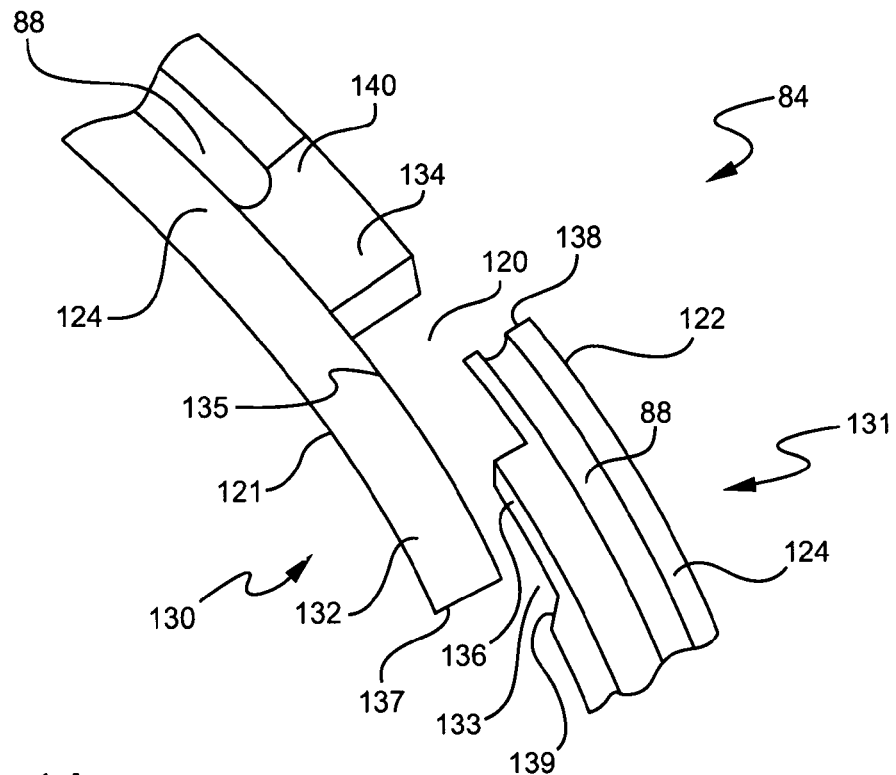
FIG. 13 shows an isometric close-up view of the free ends of the seal ring of FIG. 10.

FIG. 13 shows an isometric view of ring 84 with its free ends 130 and 131 moved apart, as also shown in FIG. 11. Free ends 130 and 131 will be moved laterally away from one another (as opposed to linearly away as shown in FIG. 11) a distance sufficient that the gap thus formed will pass over the diameter of shaft 5, after which ends 130 and 131 will be brought back into contact with the ring thus encircling that shaft.

It can be seen in FIG. 13 that protrusions 121 and 122 overlap with one another in both a side-by-side relationship and an over-under relationship. That is to say that, in the closed configuration for split 120, protrusion 122 is both over surface 132 of protrusion 121 and in a side-by side relation between its wall 136 and wall 135 of protrusion 121. Similarly, projection 132 of protrusion 121 will be in recess 133 under protrusion 122, and wall 135 of protrusion 121 will be in a side-by-side relation with wall 136 of protrusion 122.

Figure 14:
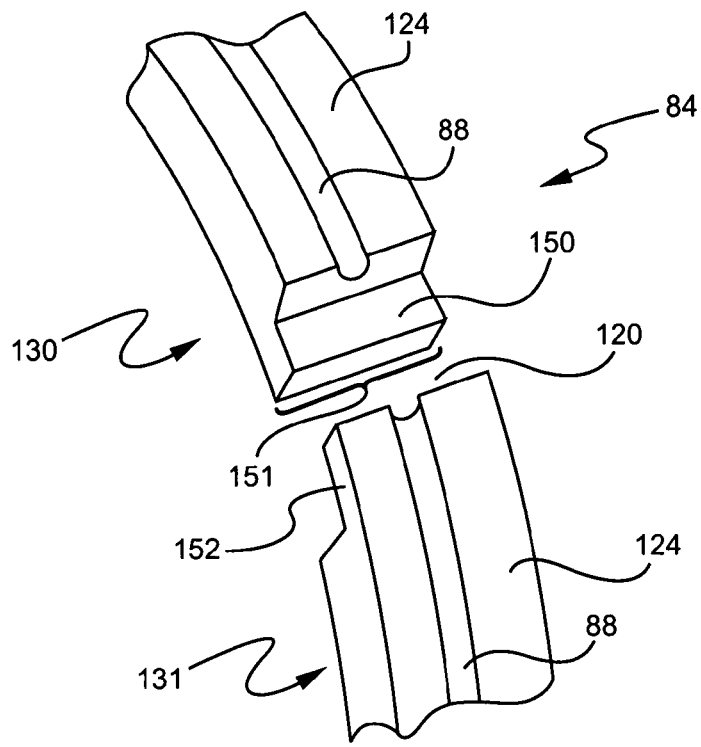
FIG. 14 show an isometric close-up view of an alternative embodiment for the free ends of the seal ring of FIG. 10.

FIG. 14 shows an isometric view of an alternative mating of free ends 130 and 131 of ring 84. In this embodiment, protrusion 150 of free end 130 is co-extensive with essentially the full width 151 of ring 84. Similarly, protrusion 152 of free end 131 is co-extensive with essentially the full width of ring 84. Protrusion 150 is carried on a lower portion along the height of ring 84, while protrusion 152 is carried on an upper portion along the height of ring 85 so that when resilient member 123 brings split 120 into its closed configuration around shaft 5, protrusion 152 is carried over protrusion 150, hence the term over lapping in the over-under relationship. In this Figure, there is no overlapping in the side-by-side relationship.

Figure 15:
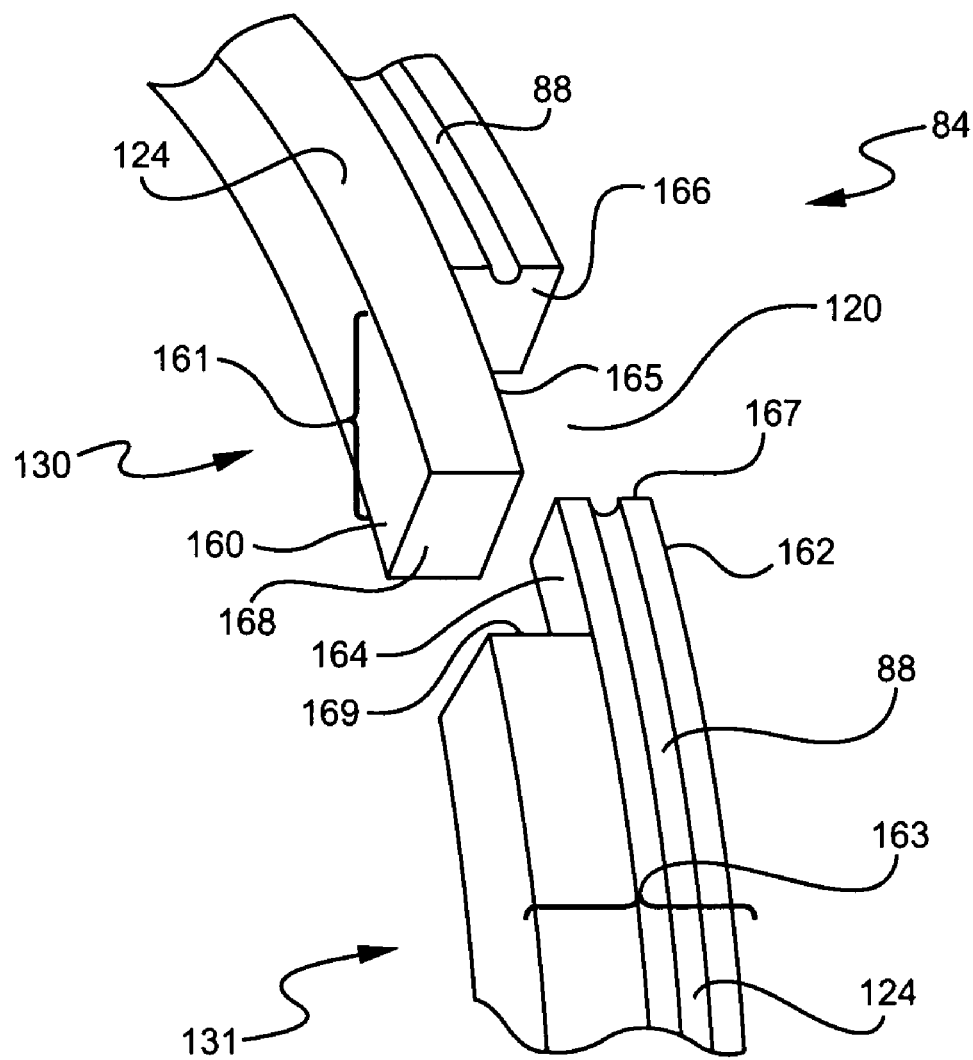
FIG. 15 shows another alternative embodiment for the free ends of the seal ring of FIG. 10.

FIG. 15 shows an isometric view of yet another embodiment for the mating of free ends 130 and 131. In this embodiment, protrusion 160 extends for the full height 161 of ring 84, the same being true for opposing protrusion 162. Both protrusions extend for only a portion of the width 163 of ring 84. Thus, when ring 84 is in its normally closed mode, walls 164 and 165 will be adjacent one another, if not in abutment, and protrusions 160 and 162 will be in a side-by-side relationship. Also, end walls 166 and 167 will be adjacent one another, if not touching. The same holds true for end walls 168 and 169. In this Figure, there is no overlapping in the over-under relationship.

We claim:

1. In a seal assembly for equipment having a rotatable shaft extending therefrom, said seal assembly having an annular packing gland adapted to attach to said equipment and surround the area of said shaft, said gland having an annular internal recess carried adjacent to said shaft area, said recess having opposed ends, said recess being essentially closed at its sealing end nearest said equipment and open at its opposing end, an annular follower slidably engaging said open end of said recess and interior of said recess, the improvement comprising a first split annular housing carried in said recess at said sealing end of said recess, said first housing having a first annular groove adjacent said shaft area, said first annular groove carrying a first resiliently closed non-fibrous split ring seal member having essentially flat opposing free ends at said split and carried by said first housing, the gland having a port communicating with a groove of the first housing, a second split annular housing carried in said recess immediately said first housing and immediately before the annular follower, said second housing having a second annular groove adjacent said shaft area, said second annular groove carrying at least two resiliently closed non-fibrous second split ring seal member having opposing free ends that overlap with one another at said split and carried by said second housing, said follower being adjacent said second housing.

2. The apparatus of claim 1 wherein each of said first seal member and said at least two second seal member have a resilient member surrounding their outer periphery, and said first and at least one second seal members all carry a groove around their outer periphery for receiving their associated surrounding resilient members.

3. The apparatus of claim 1 wherein said ent is a polymer powder rotary dryer.

4. The apparatus of claim 1 wherein said first and second seal members are composed of polyphenylene sulfide.

5. The apparatus of claim 1 wherein said at least two second split ring doubly split and carries opposing protrusions on its opposing free ends that overlap with one another.

6. The apparatus of claim 5 wherein said opposing protrusions overlap in both an over-under and a side-by-side relationship.

7. The apparatus of claim 5 wherein said opposing protrusions overlap in essentially only an over-under relationship.

8. The apparatus of claim 5 wherein said opposing protrusions overlap in essentially only a side-by-side relationship.

* * * * *